UNITED STATES PATENT OFFICE.

OTTOKAR SERPEK, OF PARIS, FRANCE, ASSIGNOR TO SOCIÉTÉ GENERALE DES NITRURES, OF PARIS, FRANCE.

REFRACTORY LINING FOR FURNACES.

1,099,131. Specification of Letters Patent. Patented June 2, 1914.

No Drawing. Application filed January 26, 1912. Serial No. 673,629.

*To all whom it may concern:*

Be it known that I, OTTOKAR SERPEK, doctor of philosophy and chemist, subject of the Emperor of Austria-Hungary, residing at 12 Rue Roquepine, Paris, France, have invented new and useful Improvements in Refractory Linings for Furnaces, of which the following is a specification.

Great difficulties have been met hitherto in attempting to form suitable refractory linings or coverings designed to work at high temperatures (of the order of 2000 degrees C., which are commonly used in electrical furnaces for example). The sub-substances most commonly employed such as carbon and magnesia present certain disadvantages: they react readily with the materials under treatment, they disintegrate quite easily and in the case of electrical furnaces, they become at these temperatures good conductors of electricity. Moreover, more particularly as regards magnesia, this presents the disadvantage of becoming fusible at these temperatures.

The present invention consists in the use of aluminium nitrid for the formation of the linings of any kind of industrial furnaces used in the metallurgic, chemical, etc., industries. It possesses the property of being able to be agglomerated; thus it may be very easily molded in the shape of blocks, bricks or briquets by using any suitable adhesive which, in the case where these bricks are used as coverings for electrical furnaces, is selected preferably so as to leave no conducting portions in the blocks or bricks after the latter have been baked. A suitable agglomerant is the sodium silicate which can be used in any suitable proportion. It has been found that ten per cent. of sodium silicate forms a suitable proportion.

The bricks being placed in the furnace and the latter set in action at high temperature, the sodium silicate is eliminated gradually without causing any disaggregation. Such bricks possess likewise the wonderful property of resisting the corrosive action of great number of chemical agents for instance of sodium salts and therefore they may be advantageously used in all the industrial furnaces of any kind of heating and principally in fixed or mechanical furnaces used in the chemical industry. In some cases, instead of using pure aluminium nitrid, the lining or the bricks may be made of a mixture of carbon and alumina or aluminous materials transformed into nitrid on the surface only (by heating in a current of nitrogen). Or a mixture of aluminium nitrid, carbon and alumina (or aluminous materials) in any suitable proportions may be agglomerated.

What I claim and desire to secure by Letters Patent of the United States is:

1. A furnace provided with a lining having as its essential ingredient aluminium nitrid to resist the action of heat and chemical agents.

2. A furnace provided with a lining, consisting essentially of aluminium nitrid with carbon and aluminous material.

3. A furnace provided with a lining, consisting of aluminium nitrid, with a backing of carbon and aluminous material.

4. The method described of forming furnace linings, consisting in lining the furnace with a mixture of carbon and aluminous material and then transforming the surface only into nitrid.

5. The method described of forming furnace linings, consisting in lining the furnace with a mixture of carbon and aluminous material and then transforming the surface only into nitrid by heating in a current of nitrogen.

In testimony whereof I have signed my name to this specification, in the presence of two subscribing witnesses.

OTTOKAR SERPEK.

Witnesses:
CHARLES DONN,
EUGÈNE LEGRIS.

Copies of this patent may be obtained for five cents each, by addressing the "Commissioner of Patents, Washington, D. C."